US012583979B2

(12) United States Patent
Henschke

(10) Patent No.: US 12,583,979 B2
(45) Date of Patent: Mar. 24, 2026

(54) COUPLED POST-CONSUMER RECYCLED POLYPROPYLENE AND PROCESS TO PROVIDE SAME

(71) Applicant: Dow Global Technologies LLC, Midland, MI (US)

(72) Inventor: Olaf Henschke, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 1030 days.

(21) Appl. No.: 17/622,936

(22) PCT Filed: Jun. 22, 2020

(86) PCT No.: PCT/US2020/038939

§ 371 (c)(1),
(2) Date: Dec. 27, 2021

(87) PCT Pub. No.: WO2020/263739

PCT Pub. Date: Dec. 30, 2020

(65) Prior Publication Data

US 2022/0325051 A1 Oct. 13, 2022

Related U.S. Application Data

(60) Provisional application No. 62/868,597, filed on Jun. 28, 2019.

(51) Int. Cl.

*C08J 3/205* (2006.01)
*C08K 5/42* (2006.01)

(52) U.S. Cl.

CPC ............... *C08J 3/2056* (2013.01); *C08K 5/42* (2013.01); *C08J 2323/06* (2013.01); *C08J 2323/12* (2013.01)

(58) Field of Classification Search

CPC ...................................................... C08J 3/2056
See application file for complete search history.

(56) References Cited

U.S. PATENT DOCUMENTS

| | | | | |
|---|---|---|---|---|
| 6,841,620 | B2 | 1/2005 | Ansems et al. | |
| 7,608,668 | B2 | 10/2009 | LiPiShan et al. | |
| 8,420,760 | B2 | 4/2013 | Hughes et al. | |
| 8,436,089 | B2 | 5/2013 | Finlayson et al. | |
| 8,603,639 | B2 | 12/2013 | Hogan et al. | |
| 10,669,413 | B2 | 6/2020 | McLoughlin et al. | |
| 2002/0052450 | A1 * | 5/2002 | Walters | C08J 3/22 525/333.9 |
| 2003/0216518 | A1 | 11/2003 | Tau et al. | |
| 2005/0070673 | A1 | 3/2005 | Novak | |
| 2009/0173441 | A1 | 7/2009 | Lutz et al. | |
| 2010/0255232 | A1 * | 10/2010 | Duguid | C08L 23/142 525/240 |
| 2010/0285253 | A1 | 11/2010 | Hughes et al. | |
| 2011/0147639 | A1 | 6/2011 | Wevers et al. | |
| 2015/0259453 | A1 | 9/2015 | Peterson et al. | |
| 2016/0222180 | A1 * | 8/2016 | McLoughlin | C08J 9/0033 |
| 2020/0199339 | A1 | 6/2020 | Peterson et al. | |

FOREIGN PATENT DOCUMENTS

| | | | | |
|---|---|---|---|---|
| CN | 108929481 | A | 12/2018 | |
| JP | 2001-009995 | A | 1/2001 | |
| WO | 1999/010424 | A1 | 3/1999 | |
| WO | WO-9910424 | A1 * | 3/1999 | C08K 5/43 |
| WO | 2019/133518 | A1 | 7/2019 | |

OTHER PUBLICATIONS

Q. Li, C. Tzoganakis; Functionalization of PP with Sulfonyl Azide Through Reactive Processing; Mar. 26, 2013; pp. 311-319; International Polymer Processing; vol. 22, Issue 3.

* cited by examiner

*Primary Examiner* — Michael F Pepitone
(74) *Attorney, Agent, or Firm* — Boyle Fredrickson S.C.

(57) ABSTRACT

The present disclosure provides a process. The process includes (i) providing a post-consumer recycled polypropylene (PCR-PP) having a melt flow rate (MFR $I_2$) equal to, or greater than, 7.0 g/10 min; (ii) adding a 4,4'-oxydibenzenesulfonyl azide (DPO-BSA) to the PCR-PP; (iii) melt blending the PCR-PP with the DPO-BSA; and (iv) forming a DPO-BSA coupled PCR-PP having a melt flow rate (MFR $I_2$) equal to, or less than, 5 g/10 min.

15 Claims, 1 Drawing Sheet

COUPLED POST-CONSUMER RECYCLED POLYPROPYLENE AND PROCESS TO PROVIDE SAME

BACKGROUND

Figure 1:
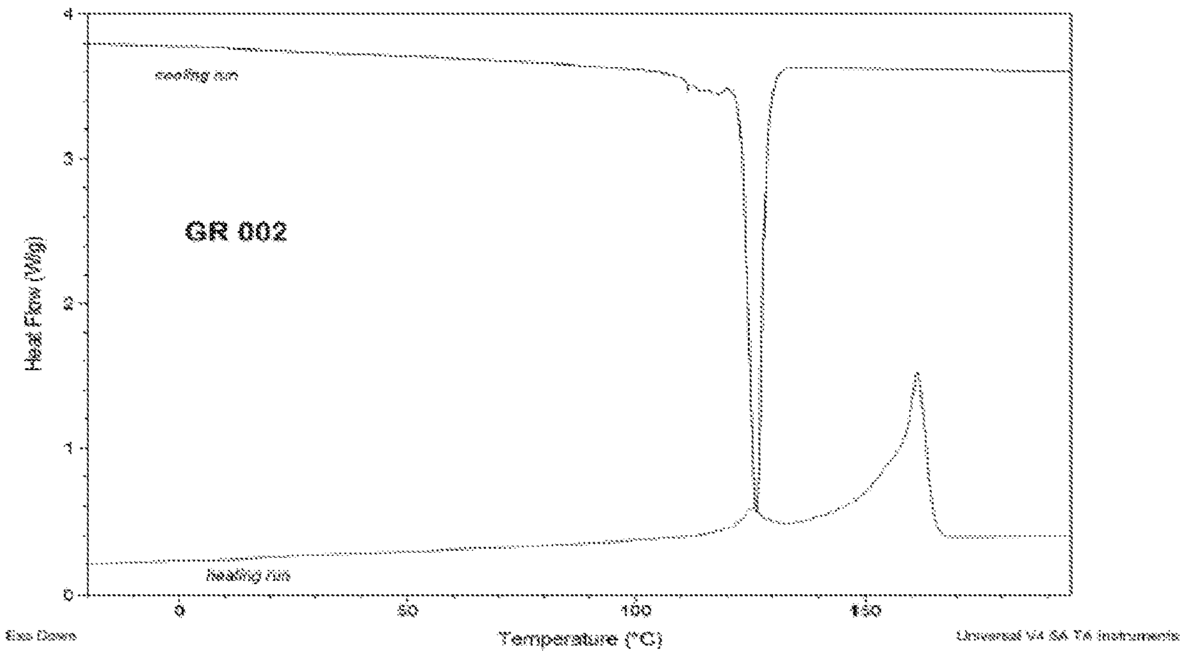

A growing need exists to be able to utilize post-consumer recycled (PCR) polymers in a variety of applications. Although modern sorting technology of PCR sources enables the polymers to be sorted into propylene-based fractions and ethylene-based fractions, the sorting process is not perfect and there is still contamination of each fraction. Because of the contamination, the applications for which each fraction may be successfully utilized are more limited than the virgin polymer counterpart. In particular, the PCR propylene-based polymer fraction does not exhibit suitable physical properties, such as melt flow rate and melt strength, for applications such as blow molded articles.

The art recognized the need for PCR propylene-based polymer with melt strength suitable for molding applications, and blow molding applications in particular.

SUMMARY

The present disclosure provides a process. The process includes (i) providing a post-consumer recycled polypropylene (PCR-PP) having a melt flow rate (MFR $I_2$) equal to, or greater than, 7.0 g/10 min; (ii) adding a 4,4'-oxydibenzenesulfonyl azide (DPO-BSA) to the PCR-PP; (iii) melt blending the PCR-PP with the DPO-BSA; and (iv) forming a DPO-BSA coupled PCR-PP having a melt flow rate (MFR $I_2$) equal to, or less than, 5 g/10 min.

The present disclosure also provides a composition. The composition includes a 4,4'-oxydibenzenesulfonyl azide coupled post-consumer recycled polypropylene (DPO-BSA coupled PCR-PP) having (i) a melt flow rate (MFR $I_2$) equal to, or less than, 5 g/10 min; and (ii) from greater than 0 ppm to 350 ppm sulfur.

The present disclosure also provides a molded article. The molded article includes a first surface layer containing a polyolefin; an inner layer containing a composition including a 4,4'-oxydibenzenesulfonyl azide coupled post-consumer recycled polypropylene (DPO-BSA coupled PCR-PP) having a melt flow rate (MFR $I_2$) equal to, or less than, 5 g/10 min; and a second surface layer containing a propylene-based polymer.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

"Alpha-olefin," "α-olefin" and like terms refer to a hydrocarbon molecule or a substituted hydrocarbon molecule (i.e., a hydrocarbon molecule comprising one or more atoms other than hydrogen and carbon, e.g., halogen, oxygen, nitrogen, etc.), the hydrocarbon molecule comprising (i) only one ethylenic unsaturation, this unsaturation located between the first and second carbon atoms, and (ii) at least 2 carbon atoms, preferably of 3 to 20 carbon atoms, in some cases preferably of 4 to 10 carbon atoms and in other cases preferably of 4 to 8 carbon atoms. Nonlimiting examples of α-olefins include ethylene, propylene, 1-butene, 1-pentene, 1-hexene, 1-octene, 1-dodecene, and mixtures of two or more of these monomers.

"Blend," "polymer blend" and like terms refer to a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method used to measure and/or identify domain configurations.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

The term "no appreciable" as used in the context of reporting alkyl branches in a $^{13}C$ NMR analysis, indicates that at a given signal to noise ratio, the branch is not detectable.

An "olefin-based polymer" or "polyolefin" is a polymer that contains more than 50 weight percent polymerized olefin monomer (based on total amount of polymerizable monomers), and optionally, may contain at least one comonomer. A nonlimiting examples of an olefin-based polymer is ethylene-based polymer.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" are used interchangeably. A nonlimiting example of a propylene-based polymer (polypropylene) is a propylene/α-olefin copolymer with at least one $C_2$ or $C_4$-$C_{10}$ α-olefin comonomer.

A "virgin polymer" is a polymer that has not been recycled, either industrially or through the consumer waste stream. Virgin polymer refers to polymer that has not been used in a manufacturing process of a plastic product, or has otherwise been recycled or reclaimed. Nonlimiting examples of virgin polymer include virgin ethylene-based polymer and virgin propylene-based polymer.

Test Methods

Charpy impact energy is measured at 23° C., 0° C., and −20° C. in accordance with ISO 179-1. The result is recorded in kilo Joules per square meter (kJ/$m^2$).

Density is measured in accordance with ASTM D792, Method B. The result is recorded in grams per cubic centimeter (g/cc).

Flexural modulus is measured in accordance with ISO 178. The result is recorded in mega Pascals (MPa).

Melt flow rate (MFR) of propylene-based polymers (such as the PCR-PP) and the composition is measured according to ASTM D1238, and is reported in grams eluted per 10 minutes (g/10 min). MFR is measured at 230° C. under a load of 2.16 kg (MFR $I_2$); and at 230° C. under a load of 10.0 kg (MFR $I_{10}$)

Melt index (MI) of ethylene-based polymers is measured according to ASTM D1238, and is reported in grams eluted per 10 minutes (g/10 min). MI is measured at 190° C. under a load of 2.16 kg (MI $I_2$); and at 190° C. under a load of 10.0 kg (MI $I_{10}$)

Shore A Hardness is measured in accordance with ASTM D2240-05.

Differential Scanning calorimetry (DSC)

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min was used. Each sample is melt pressed into a thin film at 190° C.; the melted sample is then air-cooled to room temperature (25° C.). A 3-10 mg, 6 mm diameter specimen is extracted from the cooled polymer, weighed, placed in a light aluminum pan (50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −80° C. at a 10° C./minute cooling rate and held isothermal at −80° C. for 3 minutes. The sample is then heated to 180° C. (this is the "second heat" ramp) at a 10° C./minute heating rate. The cooling and second heating curves are recorded. The values determined are extrapolated onset of melting, $T_m$, and extrapolated onset of crystallization, $T_c$. Heat of fusion ($H_f$) (in Joules per gram), and the calculated % crystallinity for polypropylene samples using the Equation below:

$$\% \text{ Crystallinity}=((H_f)/165 \text{ J/g})\times 100.$$

The heat of fusion ($H_f$) and the peak melting temperature are reported from the second heat curve. Peak crystallization temperature is determined from the cooling curve.

Melting point, $T_m$, is determined from the DSC heating curve by first drawing the baseline between the start and end of the melting transition. A tangent line is then drawn to the data on the low temperature side of the melting peak. Where this line intersects the baseline is the extrapolated onset of melting ($T_m$). This is as described in Bernhard Wunderlich, *The Basis of Thermal Analysis, in Thermal Characterization of Polymeric Materials* 92, 277-278 (Edith A. Turi ed., 2d ed. 1997).

Crystallization temperature, $T_c$, is determined from a DSC cooling curve as above except the tangent line is drawn on the high temperature side of the crystallization peak. Where this tangent intersects the baseline is the extrapolated onset of crystallization ($T_a$).

Glass transition temperature, $T_g$, is determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines are drawn from below and above the glass transition region and extrapolated through the $T_g$ region. The temperature at which the sample heat capacity is half-way between these baselines is the $T_g$.

$^1$H NMR Analysis—Total Unsaturation Per Mole Propylene

Samples are prepared by adding approximately 3.25 g of a 50/50 mixture of tetrachloroethane-d2/perchlorethylene that is 0.0015M in chromium acetylacetonate (relaxation agent) to 0.130 g sample in a 10 mm NMR tube. The samples are dissolved and homogenized by heating the tube and its contents to 110° C. The data is collected using a Bruker 400 MHz spectrometer equipped with a Bruker Dual DUL high-temperature CryoProbe. The unsaturation data is collected using 4 scans per data file, a 15.6 second pulse repetition delay with a sample temperature of 120° C. The acquisition is carried out using spectral width of 10,000 Hz and a file size of 16K data points. The presaturation experiment is run with a modified pulse sequence, Ic1prf2.zz1 using 100 scans per data file. The following calculations are used:

Moles of *H* from propylene: Mol fraction propylene*(integral area δ3.5–0.2 ppm)

Total moles propylene Mol % vinyl unsaturation/mol propylene $$\frac{\text{moles } H \text{ from propylene}}{6 \text{ protons}}$$

$$\frac{100*\text{moles vinyl}}{\text{Total moles propylene}}$$

Mol % Cis/Trans Unsaturation/mol propylene Mol % trisubstituted unsaturation/mol propylene $$\frac{100*\text{moles cis/trans}}{\text{Total moles propylene}}$$

$$\frac{100*\text{moles } trisub}{\text{Total moles propylene}}$$

Mol % vinylidene unsaturation/mol propylene $$\frac{100*\text{moles vinylidene}}{\text{Total moles propylene}}$$

Total mol % unsaturation/mol propylene

Mol % vinyl+Mole cis&trans+Mol % trisub+Mol+vinylidene

DETAILED DESCRIPTION

The present disclosure provides a process. The process includes (i) providing a post-consumer recycled polypropylene (PCR-PP) having a melt flow rate (MFR $I_2$) equal to, or greater than, 7.0 g/10 min; (ii) adding a 4,4'-oxydibenzenesulfonyl azide (DPO-BSA) to the PCR-PP; (iii) melt blending the PCR-PP with the DPO-BSA; and (iv) forming a DPO-BSA coupled PCR-PP having a melt flow rate (MFR $I_2$) equal to, or less than, 5 g/10 min.

i. Providing a Post-Consumer Recycled Polypropylene

The process includes the step of providing a post-consumer recycled polypropylene (PCR-PP) having a melt flow rate (MFR $I_2$) equal to, or greater than, 7.0 g/10 min.

A "post-consumer recycled polypropylene" or "PCR-PP" is a polymeric material that has been extruded after initial processing by the original material manufacturer. In other words, the PCR-PP is polymeric material that has been previously used—for example, as consumer packaging or industrial packaging. The PCR-PP may come from post-consumer sources, or from a mixture of post-industrial and post-consumer sources. PCR-PP also includes residue from its original use, residue such as paper, adhesive, ink, nylon, ethylene vinyl alcohol (EVOH) copolymer, polyethylene terephthalate (PET), and other odor-causing agents. Nonlimiting examples of suitable sources of PCR-PP include food packaging, consumer packaging, blow molded bottles, film, syringe cases, intravenous bags, tubing, tubing fittings, and combinations thereof. PCR-PP contains a majority amount, or greater than 50 wt %, of propylene-based polymer, based on the total weight of the PCR-PP. PCR-PP does not include, or is to the exclusion of, virgin polymer, such as virgin polypropylene. Nonlimiting examples of suitable PCR-PP include SYSTALEN PP-C32902 and SYSTALEN PP-C32900, each available from DerGrünePunkt.

The PCR-PP may include a minority amount of post-consumer recycled polymers that are not propylene-based polymers, such as post-consumer recycled ethylene-based polymer (PCR-PE). For example, if the source is a blow molded bottle with (i) a body formed from propylene-based polymer and (ii) a cap formed from ethylene-based polymer, the PCR-PP formed by a material re-processor by extruding the material contains a minority amount, or less than 50 wt % of PCR-PE, based on the total weight of the PCR-PP.

The PCR-PP contains a majority amount, or greater than 50 wt % propylene-based polymer, based on the total weight of the PCR-PP. Nonlimiting examples of suitable propylene-based polymer include propylene homopolymer, propylene/α-olefin copolymer, and combinations thereof. In an embodiment, the PCR-PP contains from greater than 50 wt % to less than 100 wt %, or from 60 wt % to less than 100 wt %, or from 70 wt % to less than 100 wt % propylene-based polymer, based on the total weight of the PCR-PP.

In an embodiment, the PCR-PP contains a minority amount, or less than 50 wt % post-consumer recycled ethylene-based polymer (PCR-PE). The PCR-PE may be any ethylene-based polymer disclosed herein. Nonlimiting examples of suitable ethylene-based polymer include ethylene homopolymer, ethylene/α-olefin copolymer, and combinations thereof.

In an embodiment, the PCR-PP contains from 70 wt % to less than 100 wt % propylene-based polymer; and a reciprocal amount of PCR-PE, or from greater than 0 wt % to 30 wt % PCR-PE, based on the total weight of the PCR-PP.

The PCR-PP is provided in a solid form—e.g., as granules and/or pellets. The PCR-PP pellet is not transparent, and is not white. The PCR-PP pellet has a non-white color because it contains pigment from the source (e.g., from pigment in a container). In an embodiment, the PCR-PP pellet has a color that is gray. In contrast, conventional virgin polypropylene is white and/or transparent.

The PCR-PP has a melt flow rate (MFR $I_2$) equal to, or greater than, 7.0 g/10 min; or equal to, or greater than, 8.0 g/10 min. In an embodiment, the PCR-PP has a MFR $I_2$ from 7.0 g/10 min, or 7.5 g/10 min, or 8.0 g/10 min, or 9.0 g/10 min, or 10 g/10 min, or 11 g/10 min, or 12 g/10 in, or 13 g/10 min to 14 g/10 min, or 15 g/10 min, or 18 g/10 min, or 20 g/10 min. In another embodiment, the PCR-PP has a MFR $I_2$ from 7.0 g/10 min to 20 g/10 min, or from 8 g/10 min to 20 g/10 min, or from 7.0 g/10 min to 15 g/10 min, or from 7.5 g/10 min to 15 g/10 min, or from 8 g/10 min to 15 g/10 min.

In an embodiment, the PCR-PP has a MFR $I_{10}$ from 100 g/10 min, or 110 g/10 min, or 120 g/10 min, or 150 g/10 min, or 200 g/10 min, or 250 g/10 min, or 280 g/10 min to 300 g/10 min, or 350 g/10 min, or 400 g/10 min. In another embodiment, the PCR-PP has a MFR $I_{10}$ from 100 g/10 min to 400 g/10 min, or from 100 g/10 min to 300 g/10 min, or from 120 g/10 min to 300 g/10 min, or from 100 g/10 min to 200 g/10 min.

In an embodiment, the PCR-PP has an MFR $I_{10}/I_2$ from 12, or 15 to less than 22, or 22, or 25, or 30, or 35. In another embodiment, the PCR-PP has an MFR $I_{10}/I_2$ from 12 to 35, or from 12 to 25, or from 12 to 22, or from 12 to less than 22.

In an embodiment, the PCR-PP has a flexural modulus from 1000 MPa, or 1050 MPa to 1200 MPa, or 1500 MPa. In another embodiment, the PCR-PP has a flexural modulus from 1000 MPa to 1500 MPa, or from 1000 MPa to 1300 MPa, or from 1050 MPa to 1200 MPa.

In an embodiment, the PCR-PP has a Charpy impact energy at 23° C. from greater than 0 kJ/$m^2$, or 1.0 kJ/$m^2$, or 5.0 kJ/$m^2$ to 6.5 kJ/$m^2$, or less than 7.0 kJ/$m^2$. In another embodiment, the PCR-PP has a Charpy impact energy at 0° C. from greater than 0 kJ/$m^2$, or 1.0 kJ/$m^2$, or 2.0 kJ/$m^2$ to 3.1 kJ/$m^2$, or 3.5 kJ/$m^2$, or 5.0 kJ/$m^2$. In another embodiment, the PCR-PP has a Charpy impact energy at −20° C. from greater than 0 kJ/$m^2$, or 0.8 kJ/$m^2$, or 1.5 kJ/$m^2$ to 2.2 kJ/$m^2$, or 2.3 kJ/$m^2$, or 5.0 kJ/$m^2$.

In an embodiment, the PCR-PP has at least two melting points. The first melting point ($Tm_1$) is from 145° C., or 155° C., or 160° C. to 163° C., or 165° C. The second melting point ($Tm_2$) is from 115° C., or 120° C., or 122° C. to 125° C., or 130° C. In an embodiment, $Tm_1$ is from 145° C. to 165° C., and $Tm_2$ is from 115° C. to 130° C.

In an embodiment, the PCR-PP has at least two crystallization temperatures. The first crystallization temperature ($Tc_1$) is from 120° C., or 125° C. to 130° C., or 135° C. The second crystallization temperature ($Tc_2$) is from 100° C. to 115° C., or less than 120° C. In an embodiment, $Tc_1$ is from 120° C. to 135° C., and $Tc_2$ is from 100° C. to less than 120° C.

In an embodiment, the PCR-PP has a MFR $I_2$ from 7.0 g/10 min to 20 g/10 min, or from 8 g/10 min to 20 g/10 min, or from 7.0 g/10 min to 15 g/10 min, or from 7.5 g/10 min to 15 g/10 min, or from 8 g/10 min to 15 g/10 min, and the PCR-PP has one, some, or all of the following properties: (i) contains from 70 wt % to less than 100 wt % propylene-based polymer, based on the total weight of the PCR-PP; and/or (ii) contains greater than 0 wt % to 30 wt % PCR-PE, based on the total weight of the PCR-PP; and/or (iii) a MFR $I_{10}$ from 100 g/10 min to 400 g/10 min, or from 100 g/10 min to 300 g/10 min, or from 120 g/10 min to 300 g/10 min, or from 100 g/10 min to 200 g/10 min; and/or (iv) an MFR $I_{10}/I_2$ from 12 to 35, or from 12 to 25, or from 12 to 22, or from 12 to less than 22; and/or (v) a flexural modulus from 1000 MPa to 1500 MPa, or from 1050 MPa to 1200 MPa; and/or (vi) a Charpy impact energy at 23° C. from greater than 0 kJ/$m^2$ to less than 7.0 kJ/$m^2$, or from 1.0 kJ/$m^2$ to 6.5 kJ/$m^2$, or from 5.0 kJ/$m^2$ to 6.5 kJ/$m^2$; and/or (vii) a Charpy impact energy at 0° C. from greater than 0 kJ/$m^2$ to 5.0 kJ/$m^2$, or from greater than 0 kJ/$m^2$ to 3.5 kJ/$m^2$, or from 2.0 kJ/$m^2$ to 3.1 kJ/$m^2$; and/or (viii) a Charpy impact energy at −20° C. from greater than 0 kJ/$m^2$ to 5.0 kJ/$m^2$, or from greater than 0 kJ/$m^2$ to 2.3 kJ/$m^2$, or from 1.5 kJ/$m^2$ to 2.2 kJ/$m^2$; and/or (ix) a $Tm_1$ from 145° C. to 165° C., or from 155° C. to 165° C., or from 160° C. to 163° C.; and/or (x) a $Tm_2$ from 115° C. to 130° C., or from 120° C. to 130° C., or from 122° C. to 125° C.; and/or (xi) a $Tc_1$ from 120° C. to 135° C., or from 120° C. to 130° C., or from 125° C. to 130° C.; and/or (xii) a $Tc_2$ from 100° C. to less than 120° C., or from 100° C. to 115° C.

The sum of the components in each of the PCR-PP, compositions, and layers disclosed herein, including the foregoing PCR-PP, yields 100 weight percent (wt %).

The PCR-PP may comprise two or more embodiments disclosed herein.

ii. Adding a 4,4'-Oxydibenzenesulfonyl Azide

The process includes the step of adding a 4,4'-oxydibenzenesulfonyl azide (DPO-BSA) to the PCR-PP.

4,4'-oxydibenzenesulfonyl azide (DPO-BSA) is a compound having the following Structure (I):

Structure (I)

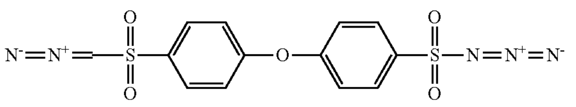

As shown in Structure (I), the DPO-BSA contains two sulfur atoms.

In an embodiment, the process includes adding from 150 ppm, or 250 ppm, or 300 ppm, or 400 ppm, or 450 ppm, or 500 ppm, or 800 ppm to 1000 ppm, or 1200 ppm, or 1500 ppm, or 1800 ppm, or 2000 ppm DPO-BSA to the PCR-PP, based on the combined weight of the DPO-BSA and the PCR-PP. In another embodiment, the process includes adding from 150 ppm to 2000 ppm, or from 250 ppm to 1800 ppm, or from 250 ppm to 1500 ppm, or from 300 ppm to 1500 ppm, or from 450 ppm to 1500 ppm, or from 800 ppm to 1500 ppm, or from 1000 ppm to 1500 ppm, or from 1100 ppm to 1500 ppm DPO-BSA to the PCR-PP, based on the combined weight of the DPO-BSA and the PCR-PP.

iii. Melt Blending the PCR-PP with the DPO-BSA

The process includes the step of melt blending the PCR-PP with the DPO-BSA. "Melt blending" is a process whereby at least two components are combined or otherwise mixed together, and at least one of the components is in a melted state. The melt blending may be accomplished by way of batch mixing, extrusion blending, extrusion molding, and any combination thereof. Melt blending may occur sequentially before extrusion. Alternatively, melt blending may occur simultaneously, or substantially simultaneously, with extrusion (i.e., melt blending and extrusion occurring in the same extruder).

Nonlimiting examples of suitable melt blending equipment include internal batch mixers, such as a Banbury™ or Boiling™ internal mixer; and continuous single mixers, or twin screw mixers, such as Farrel™ continuous mixer, a Werner and Pfleiderer™ twin screw mixer, or a Buss™ kneading continuous extruder.

Melt blending occurs at a temperature greater than the melting temperature of the PCR-PP. In an embodiment, melt blending occurs at a temperature from 160° C., or 180° C., or 200° C., or 220° C. to 240° C., or 250° C., or 260° C. In another embodiment, melt blending occurs at a temperature from 160° C. to 260° C., or from 180° C. to 250° C., or from 200° C. to 250° C. for a period of from 1 minute to 10 minutes.

During melt blending, the DPO-BSA reacts with the propylene-based polymer in the PCR-PP by coupling with the propylene-based polymer in the PCR-PP. Not wishing to be bound by any particular theory, it is believed that, during the reaction, the DPO releases nitrogen from the terminal azide groups, followed by radical formation on each side of the DOP molecule.

Surprisingly, it was found that the DPO-BSA does not react, or does not substantially react with (i.e., crosslink) the PCR-PE during melt blending. Crosslinking of ethylene-based polymer, such as PCR-PE, is disadvantageous because it results in a more brittle PCR-PP, making it unsuitable for molded article applications.

The melt blending may comprise two or more embodiments disclosed herein.

iv. Forming a DPO-BSA Coupled PCR-PP

The process includes the step of forming a DPO-BSA coupled PCR-PP having a melt flow rate (MFR $I_2$) equal to, or less than, 5 g/10 min.

The DPO-BSA coupled PCR-PP formed during melt blending is compositionally and physically distinct from the un-coupled PCR-PP.

The DPO-BSA coupled PCR-PP has a MFR $I_2$ equal to, or less than, 5 g/10 min; or equal to, or less than, 4 g/10 min; equal to, or less than, 3 g/10 min; or equal to, or less than, 2 g/10 min. A MFR $I_2$ that is equal to, or less than, 5 g/10 min is advantageous for molded article applications, such as blow molded articles, because melt flow rate is inversely related to melt strength. In other words, a DPO-BSA coupled PCR-PP with a melt flow rate (MFR $I_2$) equal to, or less than, 5 g/10 min has a higher melt strength compared to an un-coupled PCR-PP with a melt flow rate (MFR $I_2$) of at least 7 g/10 min.

In an embodiment, the DPO-BSA coupled PCR-PP has a MFR $I_2$ from greater than 0 g/10 min, or 0.1 g/10 min, or 0.5 g/10 min, or 0.9 g/10 min to 1.7 g/10 min, or 1.8 g/10 min, or 1.9 g/10 min, or 2.0 g/10 min, or 2.3 g/10 min, or 2.5 g/10 min, or 2.9 g/10 min, or 3.0 g/10 min, or 3.2 g/10 min, or 4.0 g/10 min, or 4.4 g/10 min, or 5.0 g/10 min. In another embodiment, the DPO-BSA coupled PCR-PP has a MFR $I_2$ from greater than 0 g/10 min to 5 g/10 min, or from greater than 0 g/10 min to 4 g/10 min, or from greater than 0 g/10 min to 3 g/10 min, or from greater than 0 g/10 min to 2 g/10 min, or from 0.1 g/10 min to 4.5 g/10 min, or from 0.9 g/10 min to 4.4 g/10 min.

In an embodiment, the DPO-BSA coupled PCR-PP has a MFR $I_{10}$ from greater than 0 g/10 min, or 1 g/10 min, or 10 g/10 min, or 20 g/10 min to 90 g/10 min, or less than 100 g/10 min. In another embodiment, the DPO-BSA coupled PCR-PP has a MFR $I_{10}$ from greater than 0 g/10 min to less than 100 g/10 min, or from 1 g/10 min to 90 g/10 min, or from 20 g/10 min to 90 g/10 min.

In an embodiment, the DPO-BSA coupled PCR-PP has an MFR $I_{10}/I_2$ from 12, or 15, or 18, or 19, or 20 to 29, or 30, or 35. In another embodiment, the DPO-BSA coupled PCR-PP has an MFR $I_{10}/I_2$ from 12 to 35, or from 15 to 30, or from 18 to 30.

In an embodiment, the DPO-BSA coupled PCR-PP has a flexural modulus from 800 MPa, or 850 MPa, or 1000 MPa, or 1100 MPa, or 1200 MPa to 1300 MPa, or 1500 MPa. In another embodiment, the DPO-BSA coupled PCR-PP has a flexural modulus from 800 MPa to 1500 MPa, or from 850 MPa to 1300 MPa, or from 1000 MPa to 1500 MPa.

In an embodiment, the DPO-BSA coupled PCR-PP has a Charpy impact energy at 23° C. from greater than 6.5 kJ/$m^2$, or 7.0 kJ/$m^2$ to 16 kJ/$m^2$, or 20.0 kJ/$m^2$, or 70.0 kJ/$m^2$. In another embodiment, the DPO-BSA coupled PCR-PP has a Charpy impact energy at 0° C. from 2.0 kJ/$m^2$, or 2.4 kJ/$m^2$ to 6.0 kJ/$m^2$, or 7.0 kJ/$m^2$, or 20 kJ/$m^2$. In another embodiment, the DPO-BSA coupled PCR-PP has a Charpy impact energy at −20° C. from 1.5 kJ/$m^2$, or 1.6 kJ/$m^2$ to 3.0 kJ/$m^2$, or 4.0 kJ/$m^2$. Increased Charpy impact energy at 23° C., 0° C., and −20° C. is advantageous because it indicates that the DPO-BSA coupled PCR-PP has improved ductile behavior, which is beneficial in molded article applications.

In an embodiment, the DPO-BSA coupled PCR-PP contains from greater than 0 ppm, or 25 ppm, or 42 ppm, or 50 ppm, or 67 ppm, or 75 ppm, or 84 ppm, or 134 ppm to 168 ppm, or 202 ppm, or 252 ppm, or 301 ppm, or 336 ppm, or 350 ppm sulfur, based on the total weight of the DPO-BSA coupled PCR-PP. In another embodiment, the DPO-BSA coupled PCR-PP contains from greater than 0 ppm to 350 ppm, or from 42 ppm to 301 ppm, or from 42 ppm to 252 ppm, or from 50 ppm to 252 ppm, or from 75 ppm to 252 ppm, or from 84 ppm to 252 ppm, or from 168 ppm to 252 ppm, or from 184 ppm to 252 ppm sulfur, based on the total weight of the DPO-BSA coupled PCR-PP.

In an embodiment, the DPO-BSA coupled PCR-PP has a MFR $I_2$ from greater than 0 g/10 min to 5 g/10 min, or from greater than 0 g/10 min to 4 g/10 min, or from greater than 0 g/10 min to 3 g/10 min, or from greater than 0 g/10 min to 2 g/10 min, or from 0.1 g/10 min to 4.5 g/10 min, or from 0.9 g/10 min to 4.4 g/10 min; and the DPO-BSA coupled PCR-PP has one, some, or all of the following properties: (i) a MFR $I_{10}$ from greater than 0 g/10 min to less than 100 g/10 min, or from 1 g/10 min to 90 g/10 min, or from 20 g/10 min to 90 g/10 min; and/or (ii) an MFR $I_{10}/I_2$ from 12 to 35, or from 15 to 30, or from 18 to 30; and/or (iii) a flexural modulus from 800 MPa to 1500 MPa, or from 850 MPa to 1300 MPa, or from 1000 MPa to 1500 MPa; and/or (iv) a Charpy impact energy at 23° C. from greater than 6.5 kJ/$m^2$ to 70.0 kJ/$m^2$, or from greater than 6.5 kJ/$m^2$ to 20.0 kJ/$m^2$, or from 7.0 kJ/$m^2$ to 16 kJ/$m^2$; and/or (v) a Charpy impact energy at 0° C. from 2.0 kJ/$m^2$ to 20.0 kJ/$m^2$, or from 2.0 kJ/$m^2$ to 7.0 kJ/$m^2$, or from 2.4 kJ/$m^2$ to 6.0 kJ/$m^2$; and/or (vi) a Charpy impact energy at −20° C. from 1.5 kJ/$m^2$ to 4.0 kJ/$m^2$, or from or 1.6 kJ/$m^2$ to 3.0 kJ/$m^2$; and/or (vii) contains from greater than 0 ppm to 350 ppm, or from 42 ppm to 301 ppm, or from 42 ppm to 252 ppm, or from 50 ppm to 252 ppm, or from 75 ppm to 252 ppm, or from 84 ppm to 252 ppm, or from 168 ppm to 252 ppm, or from 184 ppm to 252 ppm sulfur, based on the total weight of the DPO-BSA coupled PCR-PP.

The DPO-BSA coupled PCR-PP may comprise two or more embodiments disclosed herein.

v. Optional Melt Blending with a Virgin Polymer

In an embodiment, the process includes melt blending the DPO-BSA coupled PCR-PP with a virgin polymer to form a composition. In other words, the virgin polymer is added to the DPO-BSA coupled PCR-PP, and melt blended with the DPO-BSA coupled PCR-PP. The composition has a melt flow rate (MFR $I_2$) equal to, or less than, 5 g/10 min.

In an embodiment, the process includes adding virgin polymer to the PCR-PP, and melt blending the virgin polymer with the DPO-BSA and PCR-PP to form a composition containing DPO-BSA coupled virgin polymer and DPO-BSA coupled PCR-PP. The composition has a melt flow rate (MFR $I_2$) equal to, or less than, 5 g/10 min.

In an embodiment, the virgin polymer is a virgin polyolefin. Nonlimiting examples of suitable virgin polyolefin include ethylene-based polymer, propylene-based polymer, and combinations thereof.

A. Virgin Ethylene-Based Polymer

In an embodiment, the virgin polyolefin is an ethylene-based polymer. The ethylene based polymer can be any ethylene-based polymer disclosed herein, with the exception of the PCR-PE. In an embodiment, the virgin ethylene-based polymer is an ethylene/α-olefin multi-block copolymer.

The term "ethylene/α-olefin multi-block copolymer" refers to an ethylene/$C_4$-$C_8$ α-olefin multi-block copolymer composed of, or otherwise consisting of, ethylene and one copolymerizable $C_4$-$C_8$ α-olefin comonomer in polymerized form (and optional additives), the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. Ethylene/α-olefin multi-block copolymer includes block copolymer with two blocks (di-block) and more than two blocks (multi-block). The $C_4$-$C_8$ α-olefin is selected from butene, hexene, and octene. The ethylene/α-olefin multi-block copolymer is void of, or otherwise excludes, styrene (i.e., is styrene-free), and/or is void of vinyl aromatic monomer, and/or is void of conjugated diene. When referring to amounts of "ethylene" or "comonomer" in the copolymer, it is understood that this refers to polymerized units thereof. In some embodiments, the ethylene/α-olefin multi-block copolymer can be represented by the following formula: (AB)n; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole ethylene/α-olefin multi-block copolymer, i.e., ethylene comprises at least 50 wt % of the whole ethylene/α-olefin multi-block copolymer. More preferably, ethylene comprises at least 60 wt %, at least 70 wt %, or at least 80 wt %, with the substantial remainder of the whole ethylene/α-olefin multi-block copolymer comprising the $C_4$-$C_8$ α-olefin comonomer. In an embodiment, the ethylene/α-olefin multi-block copolymer contains from 50 wt %, or 60 wt %, or 65 wt % to 80 wt %, or 85 wt %, or 90 wt %, or 95 wt % ethylene. For many ethylene/octene multi-block copolymers, the composition comprises an ethylene content greater than 80 wt % of the whole ethylene/octene multi-block copolymer and an octene content of from 5 wt %, or 10 wt % to 15 wt %, or from 15 wt % to 20 wt % of the whole multi-block copolymer.

The ethylene/α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, greater than 10 wt %, or greater than 15 wt %, based on the weight of the polymer. In an embodiment, the comonomer content in the soft segments is greater than 20 wt %, greater than 25 wt %, greater than 30 wt %, greater than 35 wt %, greater than 40 wt %, greater than 45 wt %, greater than 50 wt %, or greater than 60 wt % and can be up to 100 wt %.

The soft segments can be present in an ethylene/α-olefin multi-block copolymer from 1 wt %, or 5 wt %, or 10 wt %, or 15 wt %, or 20 wt %, or 25 wt %, or 30 wt %, or 35 wt %, or 40 wt %, or 45 wt % to 55 wt %, or 60 wt %, or 65 wt %, or 70 wt %, or 75 wt %, or 80 wt %, or 85 wt %, or 90 wt %, or 95 wt %, or 99 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, the disclosure of which is incorporated by reference herein in its entirety. In particular, hard and soft segment weight percentages and comonomer content may be determined as described in column 57 to column 63 of U.S. Pat. No. 7,608,668.

The ethylene/α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phvs.* (1997) 107 (21), pp 9234-9238.

In an embodiment, the present ethylene/α-olefin multi-block copolymer possesses a most probable distribution of block lengths.

Nonlimiting examples of suitable ethylene/α-olefin multi-block copolymer are disclosed in U.S. Pat. No. 7,608,668, the entire content of which is incorporated by reference herein.

In an embodiment, the ethylene/α-olefin multi-block copolymer has hard segments and soft segments, is styrene-free, consists of only (i) ethylene and (ii) a $C_4$-$C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship: $Tm>-2002.9+4538.5(d)-2422.2(d)^2$, where the density, d, is from 0.860 g/cc, or 0.865 g/cc, or 0.869 g/cc to 0.875 g/cc, or 0.877 g/cc, or 0.880 g/cc, or 0.890 g/cc; and the melting point, Tm, is from 110° C., or 115° C., or 118° C. to 122° C., or 125° C., or 130° C., or 135° C.

The ethylene/α-olefin copolymer contains, consists essentially of, or consists of (i) ethylene and (ii) $C_4$-$C_8$ α-olefin comonomer. In an embodiment, the α-olefin comonomer is selected from hexene and octene. In a further embodiment, the α-olefin is octene.

In an embodiment, the ethylene/α-olefin multi-block copolymer contains, consists essentially of, or consists of (i) ethylene and (ii) $C_4$-$C_8$ α-olefin comonomer, and the ethylene/α-olefin multi-block copolymer has one, some, or all of the following properties: (i) a density from 0.860 g/cc to 0.890 g/cc, or from 0.865 g/cc to 0.880 g/cc; and/or (ii) a melting point from 110° C. to 135° C., or from 115° C. to 130° C.; and/or (iii) a melt index ($I_2$) from 0.1 g/10 min to 10 g/10 min, or from 0.1 g/10 min to 5 g/10 min, or from 0.1 g/10 min to 1 g/10 min; and/or (iv) a glass transition temperature (Tg) from −80° C. to −50° C., or from −70° C. to −60° C.; and/or (v) a Shore A hardness from 30 to 70, or from 40 to 70, or from 40 to 60, or from 50 to 60.

In an embodiment, the ethylene/α-olefin multi-block copolymer is an ethylene/octene multi-block copolymer. The ethylene/octene multi-block copolymer is sold under the tradename INFUSE™, available from The Dow Chemical Company, Midland, Michigan, USA.

The ethylene/α-olefin multi-block copolymer may comprise two or more embodiments disclosed herein.

The virgin ethylene-based polymer may comprise two or more embodiments disclosed herein.

B. Virgin Propylene-Based Polymer

In an embodiment, the virgin polyolefin is a propylene-based polymer. The propylene based polymer can be any propylene-based polymer disclosed herein, with the exception of the PCR-PP. In an embodiment, the virgin propylene-based polymer is a propylene/α-olefin copolymer. In a further embodiment, the propylene/α-olefin copolymer is a propylene/ethylene copolymer.

In an embodiment, the propylene/ethylene copolymer contains, consists essentially of, or consists of, propylene, ethylene, an optional diene comonomer, and an optional additive.

In an embodiment, the propylene/ethylene copolymer contains propylene and from greater than 0 wt %, or 0.5 wt %, or 1 wt %, or 2 wt % to 5 wt %, or 10 wt %, or 15 wt %, or 20 wt %, or 25 wt % ethylene comonomer, based on the total weight of the propylene/ethylene copolymer.

In an embodiment, the propylene/ethylene copolymer contains, consists essentially of, or consists of, from less than 100 wt %, or 99 wt %, or 98 wt % to 97 wt %, or 96 wt %, or 95 wt % units derived from propylene and a reciprocal amount, or from greater than 0 wt %, or 1 wt %, or 2 wt % to 3 wt %, or 4 wt %, or 5 wt % units derived from ethylene, based on the total weight of the propylene/ethylene copolymer.

In an embodiment, the propylene/ethylene copolymer has a density from 0.860 g/cc, or 0.863 g/cc to 0.870 g/cc, or 0.880 g/cc, or 0.890 g/cc, or 0.900 g/cc, or 0.905 g/cc.

In an embodiment, the propylene/ethylene copolymer has a MFR $I_2$ from 0.3 g/10 min, or 2.0 g/10 min, or 3.0 g/10 min, or 4.0 g/10 min to 5.0 g/10 min, or 6.0 g/10 min, or 7.0 g/10 min, or 8.0 g/10 min, or 10.0 g/10 min, or 15.0 g/10 min, or 20.0 g/10 min, or 25.0 g/10 min, or 50 g/10 min, or 70 g/10 min.

In an embodiment, the propylene/ethylene copolymer has a total unsaturation per mole of propylene from 0.01%, or 0.015% to 0.025%, or 0.03%. The total unsaturation per mole of propylene is measured by $^1H$ NMR analysis, as described above in the test methods section.

In an embodiment, the propylene/ethylene copolymer has a crystallinity from 1 wt %, or 10 wt %, or 14 wt % to 20 wt %, or 25 wt %, or 30 wt % or 40 wt %, or 50 wt %, or 60 wt %, or 70 wt %.

The term "B-value" is a measure of randomness and measures the distribution of the propylene and ethylene comonomer across the polymer chain of the propylene/ethylene copolymer. B-values range from 0 to 2. The higher the B-value, the more alternating the ethylene distribution in the propylene/ethylene copolymer. The lower the B-value, the more blocky or clustered the ethylene distribution in the propylene/ethylene copolymer. In an embodiment, the propylene/ethylene copolymer has a B-value of less than 1.0, or less than 0.99, or less than 0.98, or less than 0.97. In an embodiment, the propylene/ethylene copolymer has a B-value from 0.90, or 0.92, or 0.93, or 0.94 to 0.95, or 0.96, or 0.97, or 0.98, or 0.99.

The B-value as described by Koenig (*Spectroscopy of Polymers* (2d ed. 1999) is calculated as follows. B is defined for the propylene/ethylene copolymer as:

$$B = \frac{f_{(EP+PE)}}{2 \cdot F_E \cdot F_P},$$

where f(EP+PE)=the sum of the EP and PE diad fractions; and Fe and Fp=the mole fraction of ethylene and propylene in the copolymer, respectively. The diad fraction can be derived from triad data according to: f(EP+PE)=[EPE]+[EPP+PPE]/2+[PEP]+[EEP+PEE]/2.

In an embodiment, propylene/ethylene copolymer is characterized as having substantially isotactic propylene sequences. "Substantially isotactic propylene sequences" are sequences having an isotactic triad (mm) measured by $^{13}C$ NMR of greater than 0.85, or greater than 0.90, or greater than 0.92, or greater than 0.93. Isotactic triads refer to the isotactic sequence in terms of a triad unit in the copolymer molecular chain determined by $^{13}C$ NMR spectroscopy.

In an embodiment, the propylene/ethylene copolymer has one, some, or all of the following properties: (i) a density from 0.860 g/cc to 0.905 g/cc, or from 0.860 g/cc to 0.870 g/cc; and/or (ii) a MFR $I_2$ from 0.3 g/10 min to 70 g/10 min, or from 2.0 g/10 min to 10 g/10 min, or from 2.0 g/10 min to 8 g/10 min; and/or (iii) a crystallinity from 1 wt % to 70 wt %, or from 10% to 70%, or from 10 wt % to 50 wt %, or from 10 wt % to 20 wt %, or from 14 wt % to 20 wt %; and/or (iv) from less than 100 wt %, or 99 wt %, or 98 wt % to 97 wt %, or 96 wt %, or 95 wt %, or 90 wt %, or 85 wt % units derived from propylene and a reciprocal amount, or from greater than 0 wt %, or 1 wt %, or 2 wt % to 3 wt %, or 4 wt %, or 5 wt %, or 10 wt %, or 15 wt % units derived from ethylene, based on the total weight of the propylene/ethylene copolymer; and/or (v) a total unsaturation per mole of propylene from 0.01% to 0.03%; and/or (vi) a glass transition temperature (Tg) from −50° C. to −20° C., or from −40° C. to −30° C.; and/or (vii) a B-value from 0.90 to 0.99; and/or (viii) sequences having an isotactic triad (mm) measured by $^{13}C$ NMR of greater than 0.85; and/or (ix) a Shore A from 60 to 90, or from 70 to 90, or from 70 to 80.

The propylene/ethylene copolymer may be prepared as described in International Publication number WO 2009/067337, the entire contents of which are herein incorporated by reference.

In an embodiment, the propylene/ethylene copolymer is a propylene-based plastomer or elastomer. Nonlimiting examples of suitable propylene/ethylene copolymer that are propylene-based plastomers or elastomers are VERSIFY™ 3000 and VERSIFY™ 3401, available from The Dow Chemical Company.

The propylene/ethylene copolymer may comprise two or more embodiments disclosed herein.

The virgin propylene-based polymer may comprise two or more embodiments disclosed herein.

The virgin polymer may comprise two or more embodiments disclosed herein.

The composition contains, consists essentially of, or consists of: (i) the DPO-BSA coupled PCR-PP; (ii) optionally, the virgin polymer; and (iii) optionally, an additive. The composition has a MFR $I_2$ equal to, or less than, 5 g/10 min.

In an embodiment, the composition contains from 60 wt %, or 70 wt %, or 80 wt %, or 85 wt %, or 90 wt %, or 95 wt %, or 99 wt % to less than 100 wt %, or 100 wt % DPO-BSA coupled PCR-PP, based on the total weight of the composition. In an embodiment, the composition contains from 60 wt % to 100 wt %, or from 80 wt % to 100 wt %, or from 85 wt % to 100 wt %, or from 90 wt % to 100 wt % DPO-BSA coupled PCR-PP. In a further embodiment, the composition consists of DPO-BSA coupled PCR-PP.

In an embodiment, the composition contains, consists essentially of, or consists of: from 85 wt % to 99 wt %, or from 90 wt % to 99 wt %, or from 95 wt % to 99 wt % DPO-BSA coupled PCR-PP; and a reciprocal amount of the virgin polymer, or from 1 wt % to 15 wt %, or from 1 wt % to 10 wt % virgin polymer, or from 1 wt % to 5 wt %, based on the total weight of the composition.

In an embodiment, the composition contains one or more optional additives. Nonlimiting examples of suitable optional additives include impact modifiers, pigments, processing aids, demolding additives, mineral oil, antioxidants, flame retardants, ultra violet (UV) stabilizers, reinforcing fillers (e.g., glass fiber), anti-scratch additives, talc, calcium carbonate, mica, and combinations thereof. The composition contains from 0 wt % to 40 wt %, or from greater than 0 wt % to 25 wt % optional additive, based on the total weight of the composition.

The composition has a MFR $I_2$ equal to, or less than, 5 g/10 min; or equal to, or less than, 4 g/10 min; equal to, or less than, 3 g/10 min; or equal to, or less than, 2 g/10 min. In another embodiment, the composition has a MFR $I_2$ from greater than 0 g/10 min to 5 g/10 min, or from greater than 0 g/10 min to 4 g/10 min, or from greater than 0 g/10 min to 3 g/10 min, or from greater than 0 g/10 min to 2 g/10 min, or from 0.1 g/10 min to 4.5 g/10 min, or from 0.9 g/10 min to 4.4 g/10 min.

In an embodiment, the composition has a MFR $I_{10}$ from greater than 0 g/10 min, or 1 g/10 min, or 10 g/10 min, or 20 g/10 min to 90 g/10 min, or less than 100 g/10 min. In another embodiment, the DPO-BSA coupled PCR-PP has a MFR $I_{10}$ from greater than 0 g/10 min to less than 100 g/10 min, or from 1 g/10 min to 90 g/10 min, or from 20 g/10 min to 90 g/10 min, or from 20 g/10 min to less than 90 g/10 min.

In an embodiment, the composition has an MFR $I_{10}/I_2$ from 12, or 15, or 18, or 19, or 20 to 29, or 30, or 35. In another embodiment, the composition has an MFR $I_{10}/I_2$ from 12 to 35, or from 15 to 30, or from 18 to 30.

In an embodiment, the composition has a flexural modulus from 800 MPa, or 850 MPa, or 1000 MPa, or 1100 MPa, or 1200 MPa to 1300 MPa, or 1500 MPa. In another embodiment, the composition has a flexural modulus from 800 MPa to 1500 MPa, or from 850 MPa to 1300 MPa, or from 1000 MPa to 1500 MPa.

In an embodiment, the composition has a Charpy impact energy at 23° C. from greater than 6.5 kJ/$m^2$, or 7.0 kJ/$m^2$ to 16 kJ/$m^2$, or 20.0 kJ/$m^2$, or 70.0 kJ/$m^2$. In another embodiment, the composition has a Charpy impact energy at 0° C. from 2.0 kJ/$m^2$, or 2.4 kJ/$m^2$ to 6.0 kJ/$m^2$, or 7.0 kJ/$m^2$, or 20 kJ/$m^2$. In another embodiment, the composition has a Charpy impact energy at −20° C. from 1.5 kJ/$m^2$, or 1.6 kJ/$m^2$ to 3.0 kJ/$m^2$, or 4.0 kJ/$m^2$ In an embodiment, the composition contains from greater than 0 ppm to 350 ppm, or from 42 ppm to 301 ppm, or from 42 ppm to 252 ppm, or from 50 ppm to 252 ppm, or from 75 ppm to 252 ppm, or from 84 ppm to 252 ppm, or from 168 ppm to 252 ppm, or from 184 ppm to 252 ppm sulfur, based on the total weight of the composition.

In an embodiment, the composition the composition contains, consists essentially of, or consists of: from 60 wt % to 99 wt %, or from 85 wt % to 99 wt %, or from 90 wt % to 99 wt %, or from 95 wt % to 99 wt % DPO-BSA coupled PCR-PP; and from 1 wt % to 40 wt %, or from 1 wt % to 15 wt %, or from 1 wt % to 10 wt %, or from 1 wt % to 5 wt % virgin polymer, based on the total weight of the composition; the composition has a MFR $I_2$ from greater than 0 g/10 min to 5 g/10 min, or from greater than 0 g/10 min to 4 g/10 min, or from greater than 0 g/10 min to 3 g/10 min, or from greater than 0 g/10 min to 2 g/10 min, or from 0.1 g/10 min to 4.5 g/10 min, or from 0.9 g/10 min to 4.4 g/10 min; and the composition has one, some, or all of the following properties: (i) a MFR $I_{10}$ from greater than 0 g/10 min to less than 100 g/10 min, or from 1 g/10 min to 90 g/10 min, or from 20 g/10 min to 90 g/10 min; and/or (ii) an MFR $I_{10}/I_2$ from 12 to 35, or from 15 to 30, or from 18 to 30; and/or (iii) a flexural modulus from 800 MPa to 1500 MPa, or from 850 MPa to 1300 MPa, or from 1000 MPa to 1500

MPa; and/or (iv) a Charpy impact energy at 23° C. from greater than 6.5 kJ/$m^2$ to 70.0 kJ/$m^2$, or from greater than 6.5 kJ/$m^2$ to 20.0 kJ/$m^2$, or from 7.0 kJ/$m^2$ to 16 kJ/$m^2$; and/or (v) a Charpy impact energy at 0° C. from 2.0 kJ/$m^2$ to 20.0 kJ/$m^2$, from 2.0 kJ/$m^2$ to 7.0 kJ/$m^2$, or from 2.4 kJ/$m^2$ to 6.0 kJ/$m^2$; and/or (vi) a Charpy impact energy at −20° C. from 1.5 kJ/$m^2$ to 4.0 kJ/$m^2$, or from or 1.6 kJ/$m^2$ to 3.0 kJ/$m^2$; and/or (vii) contains from greater than 0 ppm to 350 ppm, or from 42 ppm to 301 ppm, or from 42 ppm to 252 ppm, or from 50 ppm to 252 ppm, or from 75 ppm to 252 ppm, or from 84 ppm to 252 ppm, or from 168 ppm to 252 ppm, or from 184 ppm to 252 ppm sulfur, based on the total weight of the composition.

The composition may comprise two or more embodiments disclosed herein.

The melt blending with a virgin polymer may comprise two or more embodiments disclosed herein.

The process may comprise two or more embodiments disclosed herein.

Composition

The present disclosure also provides a composition. The composition contains a 4,4'-oxydibenzenesulfonyl azide coupled post-consumer recycled polypropylene (DPO-BSA coupled PCR-PP) having (i) a MFR $I_2$ equal to, or less than, 5 g/10 min; and (ii) from greater than 0 ppm to 350 ppm sulfur.

The composition, and the DPO-BSA coupled PCR-PP may be any respective composition and DPO-BSA coupled PCR-PP disclosed herein.

In an embodiment, the DPO-BSA coupled PCR-PP contains from greater than 0 wt % to 30 wt % PCR-PE, based on the total weight of the PCR-PP.

In an embodiment, the composition contains, consists essentially of, or consists of: from 60 wt % to 99 wt %, or from 85 wt % to 99 wt %, or from 90 wt % to 99 wt %, or from 95 wt % to 99 wt % DPO-BSA coupled PCR-PP; and from 1 wt % to 40 wt %, or from 1 wt % to 15 wt %, or from 1 wt % to 10 wt %, or from 1 wt % to 5 wt % virgin polymer, based on the total weight of the composition; and the composition has a MFR $I_2$ from greater than 0 g/10 min to 5 g/10 min, or from greater than 0 g/10 min to 4 g/10 min, or from greater than 0 g/10 min to 3 g/10 min, or from greater than 0 g/10 min to 2 g/10 min, or from 0.1 g/10 min to 4.5 g/10 min, or from 0.9 g/10 min to 4.4 g/10 min. The virgin polymer is selected from virgin ethylene-based polymer, virgin propylene-based polymer, and combinations thereof. The virgin polymer may be any virgin polymer disclosed herein.

The composition may comprise two or more embodiments disclosed herein.

Molded Article

The present disclosure also provides a molded article. In an embodiment, the molded article includes (i) a first surface layer containing, consisting essentially of, or consisting of a polyolefin; (ii) an inner layer containing, consisting essentially of, or consisting of the composition described above; and (iii) a second surface layer containing, consisting essentially of, or consisting of a propylene-based polymer.

In another embodiment, the molded article includes (i) a first surface layer containing a polyolefin; (ii) an inner layer containing a composition containing a 4,4'-oxydibenzenesulfonyl azide coupled post-consumer recycled polypropylene (DPO-BSA coupled PCR-PP) having a MFR $I_2$ equal to, or less than, 5 g/10 min; and (iii) a second surface layer containing a propylene-based polymer.

The propylene-based polymer of the second surface layer is a virgin propylene-based polymer. The virgin propylene-based polymer of the second surface layer is compositionally and physically distinct from PCR-PP, and further from the DPO-BSA coupled PCR-PP.

The molded article includes three layers, or more than three layers. For example, the molded article can have three, four, five, six, seven, eight, nine, ten, eleven, or more layers. In an embodiment, the molded article contains only three layers.

i. Surface Layers

The molded article includes two surface layers. A "surface layer" is a layer with an outer surface that is exposed to, or substantially exposed to, ambient environment.

The first surface layer and the second surface layer (collectively referred to herein as the "surface layers") each is a continuous layer with two opposing surfaces, including an outer surface and in inner surface.

The first surface layer contains, consists essentially of, or consists of, a polyolefin. Nonlimiting examples of suitable polyolefins include ethylene-based polymer, propylene-based polymer, and combinations thereof.

In an embodiment, the first surface layer contains, consists essentially of, or consists of, an ethylene-based polymer.

In an embodiment, the first surface layer contains, consists essentially of, or consists of, a propylene-based polymer.

The second surface layer contains, consists essentially of, or consists of, a propylene-based polymer. The propylene-based polymer of the second surface layer may be the same or different than the propylene-based polymer of the first surface layer. In an embodiment, the second surface layer and the first surface layer contain the same propylene-based polymer.

In an embodiment, the propylene-based polymer in the second surface layer is compositionally and/or physically distinct from the propylene-based polymer in the first surface layer.

The ethylene-based polymer and the propylene-based polymer may be any respective ethylene-based polymer and propylene-based polymer, with the proviso that the ethylene-based polymer and the propylene-based polymer are virgin polymers.

The surface layers may each individually optionally contain an additive. The additive may be any optional additive disclosed herein.

The surface layers may comprise two or more embodiments disclosed herein.

ii. Inner Layer

The molded article includes an inner layer. The inner layer contains a composition containing a 4,4'-oxydibenzenesulfonyl azide coupled post-consumer recycled polypropylene (DPO-BSA coupled PCR-PP) having a MFR $I_2$ equal to, or less than, 5 g/10 min.

An "inner layer" is a layer with no surface that is exposed to, or substantially exposed to, ambient environment. In other words, the inner layer is sandwiched between the surface layers.

The inner layer is a continuous layer with two opposing surfaces, including two inner surfaces.

The composition and the DPO-BSA coupled PCR-PP may be any respective composition and the DPO-BSA coupled PCR-PP disclosed herein.

The molded article includes at least one inner layer containing the composition. In an embodiment, the molded article includes one inner layer, or more than one inner layer. For example, the molded article can have one, two three, four, five, six, seven, eight, nine, ten, eleven, or more inner layers. In an embodiment, the molded article contains only one inner layer. Each inner layer may be the same or different, with the proviso that at least one inner layer contains the composition.

The inner layer is in contact with both surface layers. The inner layer may be in direct contact or indirect contact with one or both surface layers. In an embodiment, the inner layer directly contacts one or both of the first surface layer and the second surface layer. The term "directly contacts," as used herein, is a layer configuration whereby the inner layer is located immediately adjacent to the surface layer and no intervening layers, or no intervening structures, are present between the inner layer and the surface layer.

In another embodiment, the inner layer indirectly contacts one or both of the first surface layer and the second surface layer and no intervening layers. The term "indirectly contacts," as used herein, is a layer configuration whereby an intervening layer, an intervening coating, or an intervening structure, is present between the inner layer and one or both of the first surface layer and the second surface layer.

The inner layer may comprise two or more embodiments disclosed herein.

In an embodiment, the molded article has the following Structure (II):

first surface layer/inner layer/second surface layer Structure (II).

In an embodiment, in Structure (II), the first surface layer contains, consists essentially of, or consists of a propylene-based polymer.

In an embodiment, the molded article has the following Structure (III):

first surface layer/first inner layer/second inner layer/second surface layer Structure (III).

In an embodiment, in Structure (III), the first inner layer contains, consists essentially of, or consists of a propylene/ethylene copolymer; and the second inner layer contains, consists essentially of, or consists of the composition containing the DPO-BSA coupled PCR-PP. The first surface layer contains an ethylene-based polymer.

In an embodiment, the molded article includes an inner layer consisting of 100 wt % of the DPO-BSA coupled PCR-PP, based on the total weight of the inner layer.

Nonlimiting examples of suitable molded articles include blow molded articles, injection molded articles, and rotational molded articles.

In an embodiment, the molded article is a blow molded article. Nonlimiting examples of suitable blow molded articles include containers such as for toiletries (e.g., shampoo bottles, conditioner bottles, body wash bottles), household cleaners (e.g., detergent bottles, bathroom cleaning agent bottles), and hazardous waste; signage; wheels for products such as toys, gardening products, and utility containers; fuel tanks; and furniture such as chairs.

In an embodiment, the molded article is a blow molded article, and the inner layer In an embodiment, the molded article includes an inner layer containing, consisting essentially of, or consisting of a composition containing, consisting essentially of, or consisting of: from 60 wt % to 99 wt %, or from 80 wt % to 99 wt %, or from 90 wt % to 99 wt %, or from 95 wt % to 99 wt % DPO-BSA coupled PCR-PP; and from 1 wt % to 40 wt %, or from 1 wt % to 20 wt %, or from 1 wt % to 10 wt %, or from 1 wt % to 5 wt % virgin polymer, based on the total weight of the composition; and the composition has a MFR $I_2$ from greater than 0 g/10 min to 5 g/10 min, or from greater than 0 g/10 min to 4 g/10 min, or from greater than 0 g/10 min to 3 g/10 min, or from greater than 0 g/10 min to 2 g/10 min, or from 0.1 g/10 min to 4.5 g/10 min, or from 0.9 g/10 min to 4.4 g/10 min. The virgin polymer is selected from virgin ethylene-based polymer, virgin propylene-based polymer, and combinations thereof. The virgin polymer may be any virgin polymer disclosed herein. The virgin polymer of the inner layer may be the same of different than the virgin polymer of the surface layers. In an embodiment, the inner layer, and further the composition, contains from greater than 0 ppm to 350 ppm sulfur, based on the total weight of the respective inner layer and composition. In a further embodiment, the molded article is a blow molded article.

The molded article may comprise one or more embodiments disclosed herein.

By way of example, and not limitation, some embodiments of the present disclosure will now be described in detail in the following Examples.

EXAMPLES

Materials used in the examples are provided in Table 1 below.

TABLE 1

Starting materials for compositions

| Component | Specification | Source |
|---|---|---|
| SYSTALEN PP-C32902 | PCR-polypropylene<br>MFR $I_2$ = 13.2 g/10 min; MFR $I_{10}$ = 289 g/10 min;<br>MFR $I_{10}/I_2$ = 21.9; flexural modulus = 1167 MPa | DerGrünePunkt |
| SYSTALEN PP-C32900 | PCR-polypropylene<br>MFR $I_2$ = 7.8 g/10 min; MFR $I_{10}$ = 123 g/10 min;<br>MFR $I_{10}/I_2$ = 15.8; flexural modulus = 1055 MPa | DerGrünePunkt |
| VERSIFY 3401 | propylene/ethylene copolymer<br>virgin propylene-based polymer<br>MFR $I_2$ = 8 g/10 min; density = 0.863 g/cc; Shore A = 72;<br>crystallinity = 14%; Tg = −33° C. | The Dow Chemical Company |
| SYSTALEN 32104 | PCR-LDPE (post-consumer recycled LDPE)<br>MI (190° C./5 kg) = 2-3 g/10 min | DerGrünePunkt |
| INFUSE 9077 | ethylene/α-olefin multi-block copolymer<br>virgin ethylene-based polymer<br>melt index ($I_2$) = 0.5 g/10 min; density = 0.869 g/cc;<br>Tm = 118° C.; Tg = −65° C.; Shore A = 51 | The Dow Chemical Company |

TABLE 1-continued

| Starting materials for compositions | | |
|---|---|---|
| Component | Specification | Source |
| DPO-BSA | 4,4'-oxydibenzenesulfonyl azide | Novasep |
| Talc | filler | Imerys |

Sample compositions are prepared by adding the respective components to a Haake PolyLab co-rotating twin screw extruder, and extruding the composition at a throughput of from 2.5 to 3 kg/hour. Melt blending of the components occurs in the extruder at 240° C.

The composition and properties of each sample composition are provided in Table 2 below.

FIG. 1 is the DSC curve for CS 1. In other words, FIG. 1 is a DSC curve for SYSTALEN PP-C32902. As shown, the heating run (i.e., melting temperature) curve has two peaks—one at about 125° C. and one at about 160° C. The 125° C. peak indicates that SYSTALEN PP-C32902 contains post-consumer recycled ethylene-based polymer (PCR-PE), and the 160° C. peak indicates that SYSTALEN PP-C32902 contains propylene-based polymer. The cooling run (i.e., crystallization temperature) curve also has two

TABLE 2

| | CS 1 | CS 2 | Ex 1 | Ex 2 | Ex 3 | Ex 4 | CS 3 | Ex 5 | Ex 6 | Ex 7 | Ex 8 |
|---|---|---|---|---|---|---|---|---|---|---|---|
| SYSTALEN PP-C32902 | 100 | 65 | 99.92 | 99.885 | 99.85 | 95.95 | — | — | — | — | — |
| SYSTALEN PP-C32900 | — | — | — | — | — | — | 100 | 99.97 | 99.945 | 99.92 | 91.9775 |
| VERSIFY 3401 | — | — | — | — | — | — | — | — | — | — | 7.9775 |
| SYSTALEN 32104 | — | 20 | — | — | — | — | — | — | — | — | — |
| INFUSE 9077 | — | 5 | — | — | — | 3.95 | — | — | — | — | — |
| DPO-BSA | — | — | 0.08 | 0.115 | 0.15 | 0.1 | — | 0.03 | 0.055 | 0.08 | 0.045 |
| Talc | — | 10 | — | — | — | — | — | — | — | — | — |
| Total wt % | 100 | 100 | 100 | 100 | 100 | 100 | 100 | 100 | 100 | 100 | 100 |
| Total ppm DPO-BSA[1] | 0 | 0 | 800 | 1150 | 1500 | 1000 | 0 | 300 | 550 | 800 | 450 |
| Total ppm sulfur[2] | 0 | 0 | 134.4 | 193.2 | 252 | <168 | 0 | 50.4 | 92.4 | 134.4 | <75.6 |
| MFR $I_2$ (g/10 min) | 13.2 | 7 | 4.4 | 1.8 | 0.9 | 2.9 | 7.8 | 4.1 | 2.3 | 1.7 | 3.2 |
| MFR$I_{10}$ (g/10 min) | 289 | NM | 88 | 43 | 26 | 63 | 123 | 78 | 51 | 36 | 58 |
| MFR $I_{10}/I_2$ | 21.9 | NM | 22 | 23.9 | 28.9 | 21.7 | 15.8 | 19 | 22.2 | 21.2 | 18.1 |
| Flexural Modulus (MPa) | 1167 | 1140 | 1276 | 1293 | 1263 | 1148 | 1055 | 1127 | 1128 | 1149 | 885 |
| Charpy 23° C. (kJ/$m^2$) | 5.8 | 14.9 | 7.8 | 9.5 | 9.6 | 15.6 | 6.2 | 7 | 7.6 | 7.6 | 16 |
| Charpy 0° C. (kJ/$m^2$) | 3.1 | NM | 3.7 | 3.9 | 3.9 | 5.6 | 2.4 | 2.8 | 2.4 | 2.7 | 4.9 |
| Charpy −20° C. (kJ/$m^2$) | 2.2 | 3.2 | 2.3 | 2.3 | 2.3 | 3 | 1.6 | 1.6 | 1.6 | 1.7 | 1.7 |

[1]Based on the total combined weight of the DPO-BSA, PCR-PP, and optional virgin polymer.

[2]Based on the total weight of the composition containing DPO-BSA coupled PCR-PP.

peaks—one at about 120° C. and one at about 125° C. The 120° C. peak indicates that SYSTALEN PP-C32902 contains PCR-PE, and the 125° C. peak indicates that SYSTALEN PP-C32902 contains propylene-based polymer. SYSTALEN PP-C32902 contains a majority amount (greater than 50 wt %) propylene-based polymer, based on the total weight of the SYSTALEN PP-C32902.

Figure 2:
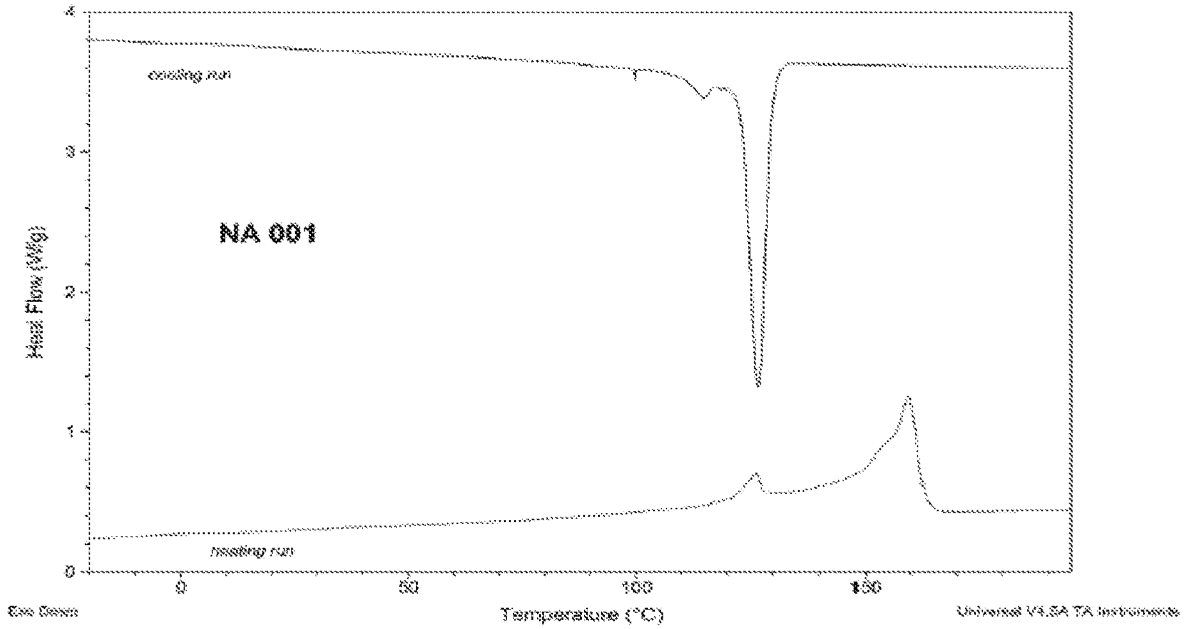

FIG. 2 is the DSC curve for CS 3. In other words, FIG. 2 is a DSC curve for SYSTALEN PP-C32900. As shown, the heating run (i.e., melting temperature) curve has two peaks—one at about 125° C. and one at about 160° C. The 125° C. peak indicates that SYSTALEN PP-C32900 contains PCR-PE, and the 160° C. peak indicates that SYSTALEN PP-C32900 contains propylene-based polymer. The cooling run (i.e., crystallization temperature) curve also has two peaks—one at about 115° C. and one at about 125° C. The 115° C. peak indicates that SYSTALEN PP-C32900 contains PCR-PE, and the 125° C. peak indicates that SYSTALEN PP-C32900 contains propylene-based polymer. SYSTALEN PP-C32900 contains a majority amount (greater than 50 wt %) propylene-based polymer, based on the total weight of the SYSTALEN PP-C32900, As shown in Table 2, CS 1 and CS 3 each contains PCR-PP (SYSTALEN PP-C32902 or SYSTALEN PP-C32900) that has not been coupled with DPO-BSA. As shown in Table 2, CS 1 and CS 2 each exhibits a MFR $I_2$ of greater than 2 g/10 min (13.2 g/10 min and 7.8 g/10 min, respectively). Consequently, CS 1 and CS 3 each is unsuitable for blow molded article applications.

CS 2 contains PCR-PP (SYSTALEN PP-C32902), PCR-PE (SYSTALEN 32104), and virgin ethylene-based polymer (INFUSE 9077) that has not been coupled with DPO-BSA. CS 2 exhibits a MFR $I_2$ of greater than 2 g/10 min (7 g/10 min). Consequently, CS 2 is unsuitable for blow molded article applications.

Applicant unexpectedly found that coupling PCR-PP (SYSTALEN PP-C32902 or SYSTALEN PP-C32900) having a MFR $I_2$ greater than 7 g/10 min (13.2 g/10 min and 7.8 g/10 min, respectively) with DPO-BSA results in a coupled PCR-PP (Ex 1-3, Ex 5-7) with a MFR $I_2$ of equal to, or less than, 5 g/10 min, as shown in Table 2. Consequently, Ex 1-3 and Ex 5-7 each is suitable for blow molded article applications.

Ex 4 is a composition containing (i) virgin ethylene-based polymer (INFUSE 9077) and (ii) PCR-PP (SYSTALEN PP-C32902) having a MFR $I_2$ greater than 7 g/10 min (13.2 g/10 min) that has been coupled with DPO-BSA. The resulting coupled PCR-PP of Ex 4 exhibits a MFR $I_2$ of equal to, or less than, 5 g/10 min. The composition of Ex 4 also exhibits a melt flow of equal to, or less than, 5 g/10 min (2.9 g/10 min). Consequently, Ex 4 is suitable for blow molded article applications.

Ex 8 is a composition containing (i) virgin propylene-based polymer (VERSIFY 3401) and (ii) PCR-PP (SYS- TALEN PP-C32900) having a MFR $I_2$ greater than 7 g/10 min (7.8 g/10 min) that has been coupled with DPO-BSA. The resulting coupled PCR-PP of Ex 8 exhibits a MFR $I_2$ of equal to, or less than, 5 g/10 min. The composition of Ex 8 also exhibits a melt flow of equal to, or less than, 5 g/10 min (3.2 g/10 min). Consequently, Ex 8 is suitable for blow molded article applications.

It is specifically intended that the present disclosure not be limited to the embodiments and illustrations contained herein, but include modified forms of those embodiments including portions of the embodiments and combinations of elements of different embodiments as come within the scope of the following claims.

I claim:

1. A process comprising:

(i) providing a post-consumer recycled polypropylene (PCR-PP) void of virgin polypropylene and having a melt flow rate (MFR $I_2$) equal to, or greater than, 7.0 g/10 min, and a property selected from the group consisting of (i) a MFR $I_{10}/I_2$ from 12 to 35, (ii) at least two melting points, and (iii) combinations thereof;

(ii) adding a 4,4'-oxydibenzenesulfonyl azide (DPO-BSA) to the PCR-PP;

(iii) melt blending the PCR-PP with the DPO-BSA; and (iv) forming a DPO-BSA coupled PCR-PP having a melt flow rate (MFR $I_2$) equal to, or less than, 5 g/10 min.

2. The process of claim 1 comprising adding from 150 ppm to 2000 ppm DPO-BSA to the PCR-PP.

3. The process of claim 1 comprising providing PCR-PP comprising equal to, or greater than, 70 wt % propylene-based polymer; and post-consumer recycled ethylene-based polymer (PCR-PE).

4. The process of claim 1 comprising providing PCR-PP having a melt flow rate (MFR $I_2$) equal to, or greater than, 8.0 g/10 min.

5. The process of claim 1 comprising melt blending the DPO-BSA coupled PCR-PP with a virgin polymer to form a composition having a melt flow rate (MFR $I_2$) equal to, or less than, 5 g/10 min, the virgin polymer selected from the group consisting of virgin ethylene-based polymer, virgin propylene-based polymer, and combinations thereof.

6. The process of claim 1 comprising forming the DPO-BSA coupled PCR-PP having a melt flow rate (MFR $I_2$) equal to, or less than, 2 g/10 min.

7. A composition comprising:

a 4,4'-oxydibenzenesulfonyl azide coupled post-consumer recycled polypropylene (DPO-BSA coupled PCR-PP) having (i) a melt flow rate (MFR $I_2$) equal to, or less than, 5 g/10 min; and (ii) from greater than 0 ppm to 350 ppm sulfur, wherein the DPO-BSA coupled PCR-PP is void of virgin polypropylene, and the PCR-PP prior to coupling has a property selected from the group consisting of (i) a MFR/$I_{10}/I_2$ from 12 to 35, (ii) at least two melting points, and (iii) combinations thereof.

8. The composition of claim 7 wherein the DPO-BSA coupled PCR-PP comprises from greater than 0 wt % to 30 wt % post-consumer recycled ethylene-based polymer (PCR-PE), based on the total weight of the DPO-BSA coupled PCR-PP.

9. The composition of claim 7 further comprising from greater than 0 wt % to 5 wt % of a virgin polymer selected from the group consisting of virgin ethylene-based polymer, virgin propylene-based polymer, and combinations thereof.

10. A molded article comprising a first surface layer comprising a polyolefin;

an inner layer comprising the composition of claim 7; and a second surface layer comprising a propylene-based polymer.

11. A molded article comprising a first surface layer comprising a polyolefin;

an inner layer comprising a composition comprising a 4,4'-oxydibenzenesulfonyl azide coupled post-consumer recycled polypropylene (DPO-BSA coupled PCR-PP) void of virgin polypropylene and having a melt flow rate (MFR $I_2$) equal to, or less than, 5 g/10 min wherein the PCR-PP prior to coupling has a property selected from the group consisting of (i) a MFR $I_{10}/I_2$ from 12 to 35, (ii) at least two melting points, and (iii) combinations thereof; and a second surface layer comprising a propylene-based polymer.

12. The molded article of claim 11, wherein the first surface layer comprises a polyolefin selected from the group consisting of an ethylene-based polymer, a propylene-based polymer, and combinations thereof.

13. The molded article of claim 11, wherein the inner layer consists of 100 wt % of the DPO-BSA coupled PCR-PP, based on the total weight of the inner layer.

14. The molded article of claim 11, wherein the inner layer composition comprises (i) the DPO-BSA coupled PCR-PP and (ii) from greater than 0 wt % to 5 wt % of a virgin polymer selected from the group consisting of virgin ethylene-based polymer, virgin propylene-based polymer, and combinations thereof.

15. The molded article of claim 11, wherein the inner layer comprises from greater than 0 ppm to 350 ppm sulfur.

* * * * *